United States Patent [19]

Schirmer

[11] Patent Number: 4,935,089
[45] Date of Patent: Jun. 19, 1990

[54] METHOD OF MAKING A THERMOFORMABLE BARRIER SHEET

[75] Inventor: Henry G. Schirmer, Spartanburg, S.C.

[73] Assignee: W. R. Grace & Co.-Conn., Duncan, S.C.

[21] Appl. No.: 334,825

[22] Filed: Apr. 7, 1989

Related U.S. Application Data

[62] Division of Ser. No. 115,452, Oct. 30, 1987, Pat. No. 4,847,148.

[51] Int. Cl.$^5$ .............................................. B32B 31/28
[52] U.S. Cl. .............................. 156/272.6; 156/273.3; 156/308.2; 156/309.6; 156/309.9; 156/320; 156/332; 204/165
[58] Field of Search ............... 428/516, 518, 520, 522, 428/332, 308.4; 156/82, 153, 229, 244.11, 244.23, 244.27, 272.6, 273.3, 273.5, 275.7, 308.2, 309.6, 309.9, 320, 322, 332, 629, 668; 204/164, 165, 167

[56] References Cited

U.S. PATENT DOCUMENTS

| | | | |
|---|---|---|---|
| T888,001 | 7/1971 | Drake, Jr. | 156/272.6 |
| 3,684,633 | 8/1972 | Haase | 161/44 |
| 3,748,218 | 7/1973 | Newman et al. | 161/253 |
| 3,793,135 | 2/1974 | Monia | 161/165 |
| 3,823,211 | 7/1974 | Colombo | 264/47 |
| 4,004,075 | 1/1977 | Richmond et al. | 526/342 |
| 4,055,672 | 10/1977 | Hirach et al. | 426/127 |
| 4,056,587 | 11/1977 | Honkanen et al. | 264/53 |
| 4,076,570 | 2/1978 | Medley et al. | 156/244 |
| 4,096,013 | 6/1978 | Lutzmann | 156/272.6 |
| 4,111,349 | 9/1978 | Buckler et al. | 229/35 |
| 4,221,836 | 9/1980 | Rutledge et al. | 428/220 |
| 4,243,725 | 1/1981 | Wiggins et al. | 428/517 |
| 4,332,858 | 6/1982 | Saitoh et al. | 428/412 |
| 4,386,138 | 5/1983 | Arbit | 156/272.6 |
| 4,402,889 | 9/1983 | Bonis | 264/37 |
| 4,440,824 | 4/1984 | Bonis | 428/216 |
| 4,484,971 | 11/1984 | Wang | 156/272.6 |
| 4,558,099 | 5/1986 | Diez | 215/232 |
| 4,659,785 | 4/1987 | Nagano et al. | 525/324 |
| 4,772,348 | 9/1988 | Hirokawa | 156/272.6 |
| 4,788,105 | 11/1988 | Mueller | 428/520 |
| 4,832,775 | 5/1989 | Park | 156/272.6 |
| 4,847,148 | 7/1989 | Schirmer | 428/520 |
| 4,853,287 | 8/1989 | Schirmer | 428/520 |

Primary Examiner—Merrell C. Cashion, Jr.
Attorney, Agent, or Firm—John J. Toney; William D. Lee, Jr.; Mark B. Quatt

[57] ABSTRACT

Thermoformable barrier sheet includes a barrier film having low oxygen transmission, and a thermoformable plastic, especially a foamed or unfoamed polystyrene sheet bonded thereto. Bonding can be accomplished by corona bonding or by thermal bonding.

3 Claims, 3 Drawing Sheets

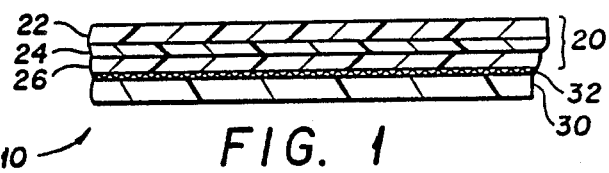
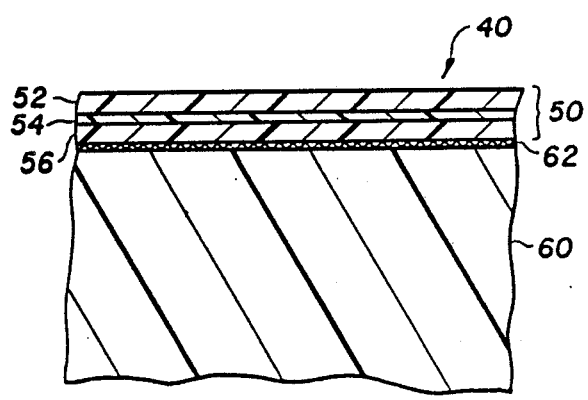

METHOD OF MAKING A THERMOFORMABLE BARRIER SHEET

FIELD OF THE INVENTION

The present invention relates to packaging materials, and more particularly to packaging materials useful in the packaging of fresh red meat and other oxygen-sensitive products.

BACKGROUND OF THE INVENTION

The thermoforming process is a common method of forming trays for food packaging. Various materials have been used, in rollstock form, as a feedstock material for forming trays for food packaging. One example is the foamed polystyrene tray used in the packaging of fresh red meat. In this end use, the tray forms a support for the meat product, and is typically overwrapped with a clear thermoplastic sheet or film.

Current marketing and distribution practices in the sale of food products, and particularly meat products, have put an increasing demand on the packaging materials to provide needed shelf life. Therefore, packaging in which oxygen transmission rates are lowered is especially in demand in the case of oxygen-sensitive products such as fresh red meat.

It is an object of the present invention to combine low oxygen transmission rates in a packaging system coupled with the advantages of foamed or unfoamed polystyrene or other thermoformable plastics.

It is a further object of the present invention to provide such a combination in which the resulting sheet is thermoformable or useful in vacuum skin packaging (VSP) techniques.

SUMMARY OF THE INVENTION

A thermoformable barrier sheet comprises a surface layer comprising a thermoplastic polymer; an internal layer comprising a polymer having a low oxygen transmission; a bonding layer comprising a polymer capable of adhesion to a thermoformable plastic when exposed to corona discharge or heat and pressure; and a layer of a thermoformable plastic.

In another aspect of the present invention, a method of making a thermoformable barrier sheet comprises the steps of providing a film comprising a surface layer comprising a thermoplastic polymer, an internal layer comprising a polymer having a low oxygen transmission, and a bonding layer comprising a polymer capable of adhesion to a thermoformable plastic when exposed to corona discharge; providing a thermoformable plastic sheet; exposing the bonding layer of the film to corona discharge; and bonding the film and sheet together.

In yet another aspect of the present invention, a method of making a thermoformable barrier sheet comprises the steps of providing a film comprising a surface layer comprising a thermoplastic polymer, an internal layer comprising a polymer having low oxygen transmission, and a bonding layer comprising a polymer capable of adhesion to a thermoformable plastic when exposed to heat and pressure; providing a thermoformable plastic sheet; bringing the film and sheet together; and exposing the film and sheet to heat and pressure.

INFORMATION DISCLOSURE STATEMENT

Several patents relating generally to the field of the invention are listed and discussed briefly in the paragraphs which follow.

U.S. Pat. No. 3,684,633 issued to Haase on Aug. 15, 1972 and discloses a laminated thermoplastic foam-film dish having a polystyrene foam lamina interposed between two layers of biaxially oriented polystyrene film. Lamination is done by heat sealing the film to the foam. The laminate is then thermoformed.

U.S. Pat. No. 3,748,218 issued on July 24, 1973 to Newman et al and discloses a rigid multi-layer formed sheet structure having a layer of saran adhered by tie layers to outer layers of impact polystyrene or polyvinyl chloride.

U.S. Pat. No. 3,793,135 issued on Feb. 19, 1974 to Monia and discloses a formable barrier packaging material having a methyl methacrylate styrene polymer coated by means of an adhesive to vinyl chloride vinylidene chloride polymer. The packaging material can be readily drawn in a mold to form a package.

U.S. Pat. No. 3,823,211 issued on July 9, 1974 to Colombo and discloses a laminate having a foamed polystyrene layer sandwiched between acrylonitrile-butadiene-styrene copolymer or impact styrene polymer layers. In producing the laminates, an inner foam bubble heat seals to an outer film bubble.

U.S. Pat. No. 4,004,075 issued on Jan. 18, 1977 to Richmond et al and discloses a packaging film in which an acrylonitrile-styrene-isobutylene interpolymer is optionally foamed, and the film can be in the form of an actual container of various shapes. Vacuum molding is a suitable process in connection with the use of this film. The interpolymer layer can act as a vapor barrier layer in combination with one or more layers of polystyrene.

U.S. Pat. No. 4,055,672 issued on Oct. 25, 1977 to Hirsch et al and discloses a tray having impact polystyrene with a coat of saran, and a lid comprising polyester, cellophane, or nylon with a saran coating.

U.S. Pat. No. 4,056,587 issued on Nov. 1, 1977 to Honkanen et al and discloses a polystyrene foam sheet further expanded by impregnating with water and heating.

U.S. Pat. No. 4,076,570 issued on Feb. 28, 1978 to Medley et al and discloses a multiple layer laminate having layers of vinylidene chloride polymer, acrylonitrile-butadiene-styrene, impact polystyrene, and optionally fourth and fifth layers identical to the second and first layers respectively. This laminate is useful in thermoforming applications.

U.S. Pat. No. 4,111,349 issued on Sept. 5, 1978 to Buckler et al and discloses containers formed from laminates containing filled polystyrene which may be solid or foamed, with an additional outer layer of polypropylene or acrylonitrile as barrier material, and another outer layer of crystal polystyrene. The laminates may be produced by coextrusion techniques using adhesive layers of ethylene vinyl acetate copolymer, or by heat pressing.

U.S. Pat. No. 4,221,836 issued on Sept. 9, 1980 to Rutledge et al and discloses coextruded plastic sheeting having a layer of impact polystyrene bonded by means of an intermediate layer to an outer layer of acrylonitrile-butadiene-styrene polymer. The sheeting is useful in thermoforming applications.

U.S. Pat. No. 4,243,725 issued on Jan. 6, 1981 to Wiggins et al and discloses nitrile barrier resin and high impact polystyrene adhered together by means of a blended tie layer.

U.S. Pat. No. 4,332,858 issued on June 1, 1982 to Saitoh et al and discloses a multi-layer laminate having a modified styrene butadiene block copolymer adhered to a vinylidene chloride polymer.

U.S. Pat. No. 4,402,889 issued on Sept. 6, 1983 to Bonis discloses a coextruded multi-layer plastic sheet having one or more layers of high impact polystyrene.

U.S. Pat. No. 4,440,824 issued on Apr. 3, 1984 to Bonis discloses a thermoformable coextruded multi-layer structure having an interior layer of polyolefin adhered by intermediate adhesive layers to outer layers of high impact polystyrene.

U.S. Pat. No. 4,558,099 issued on May 13, 1986 to Diez discloses a film seal for a container having a polymeric foam or pulpboard backing, an optional vapor barrier such as polyvinylidene chloride, and a biaxial polystyrene.

U.S. Pat. No. 4,659,785 issued on Apr. 21, 1987 to Nagano et al discloses a hot melt adhesive composition which may be used in connection with a polyolefin or a polyvinylidene chloride as one outer layer, and a foam polystyrene as another outer layer to form a laminated article.

BRIEF DESCRIPTION OF THE DRAWINGS

Further details are given below with reference to the drawings wherein:

FIG. 1 is a schematic cross-section of a preferred embodiment of a multi-layer sheet of the invention;

FIG. 2 is a schematic cross-section of another preferred embodiment employing foamed polystyrene;

DESCRIPTION OF THE PREFERRED EMBODIMENTS

Figure 3:
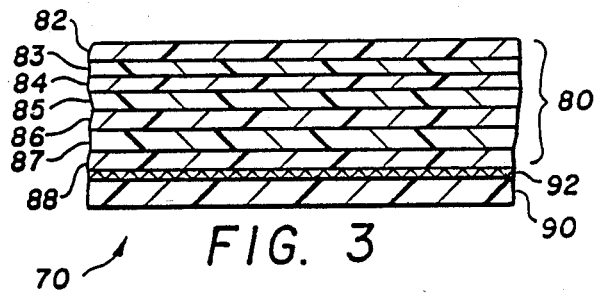
FIG. 3 is a schematic cross-section of an alternate embodiment of the inventive sheet.

With reference to FIG. 1 of the drawings, a thermoformable sheet 10 has a film 20 and a polystyrene sheet 30 which are bonded together at bonding interface 32. Layer 22 of film 20 is a surface layer of the film made up of a polymer having abuse or heat resistance. Where the property primarily desired in surface layer 22 is abuse resistance, preferred materials are polypropylene, ethylene propylene copolymer, or linear low density polyethylene. These materials are especially preferred where subsequent bonding of film 20 and sheet 30 is accomplished by heat and pressure.

Where the property primarily desired in surface layer 22 is heat sealability, preferred materials are ethylene polymers and copolymers, such as ethylene vinyl acetate copolymer. These materials are especially preferred where subsequent bonding of film 20 and sheet 30 is accomplished by corona bonding.

Layer 24 of film 20 provides the overall sheet with enhanced gas barrier characteristics, and particularly barrier to oxygen transmission. Preferred oxygen barrier resins for layer 24 are vinylidene chloride copolymers and ethylene vinyl alcohol copolymers. Especially preferred vinylidene chloride copolymers are those having comonomers comprising vinyl chloride or methyl acrylate.

Layer 26 of film 20 will interface with polystyrene sheet 30, and therefore must have a surface which will adhere to polystyrene when exposed to corona discharge or heat and pressure. Preferred resins for layer 26 include ethylene unsaturated ester copolymer such ethylene n-butyl acrylate copolymer (EBA) and ethylene vinyl acetate copolymer(EVA). More preferably, ethylene vinyl acetate copolymers with a relatively high percentage of vinyl acetate are used in bonding layer 26. Most preferably, EVA having a vinyl acetate content of between about 20% and 28% is used.

Layer 30 of FIG. 1 depicts an unfoamed polystyrene sheet bonded at interface 32 to film 20.

Referring to FIG. 2, a thermoformable barrier sheet substantially like that of FIG. 1 is shown in which the polystyrene sheet 60 represents an expanded or foamed polystyrene. The sheet 60 will therefore will have a much greater thickness than a comparable unfoamed version of the same material. Expanded polystyrene is conventionally used in food trays for retail sale. Film 50 of sheet 40 has a surface layer 52, barrier layer 54, and bonding layer 56 comparable to layers 22, 24, and 26 respectively of film 20.

The bonding interface 62 represents a bond produced by corona discharge or heat and pressure treatment as described further below.

Depending on the nature of the barrier materials and other resins utilized in the film component of the thermoformable barrier sheet of the present invention, various additional layers including polymeric adhesive layers may be included in the film structure. The is shown in FIGS. 3 and 4.

Figure 4:
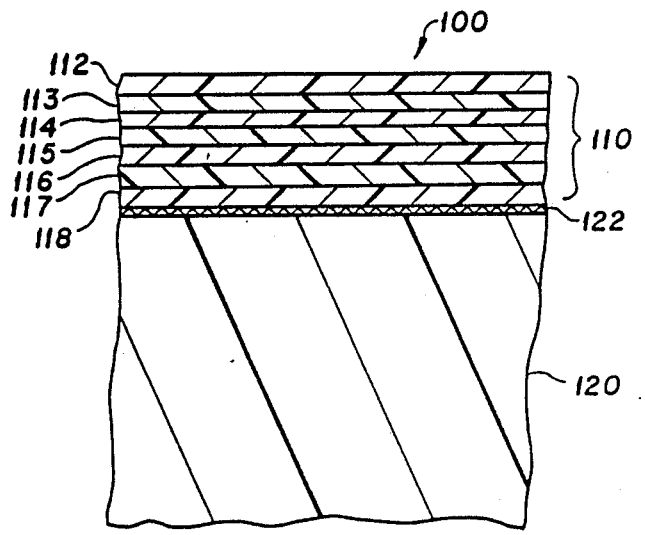
FIG. 4 is a schematic cross-section of an alternate embodiment employing foamed polystyrene.

In FIG. 3, film 80 provides the enhanced gas barrier characteristics of the overall sheet by means of film layer 86.

Layer 82 is a surface layer providing abuse or heat resistant properties as discussed earlier for layer 22 of film 20, and layer 52 of film 50.

Bonding layer 88 of film 80 utilizes the same materials as those of layers 26 and 56 of film 20 and 50 respectively.

Additionally, barrier layer 86 has on each surface thereof a polymeric adhesive (layers 85 and 87), preferably an ethylene unsaturated ester copolymer such as ethylene vinyl acetate copolymer, or a chemically modified version thereof.

Layers 83 and 84 may include materials providing processing advantages or other characteristics useful in the end use application of the material. For example, various polyolefins and olefin copolymers, including ethylene vinyl acetate copolymer and linear low density polyethylene, may be utilized in such layers to enhance one or more desired physical properties of the final sheet. Fractional melt index materials may also be utilized to improve the thermoformability of the sheet.

Referring to FIG. 4, a structure comparable to FIG. 3 is shown except that sheet 120 represents a foamed version of the polystyrene depicted as sheet 90 in FIG. 3.

Films 80 and 110 are identical for purposes of illustration. Therefore, surface layers 82 and 112 of the respective figures are identical as are barrier layers 86 and 116, and bonding layers 88 and 118.

Likewise, polymeric adhesive layers 115 and 117 are equivalent to polymeric adhesive layers 85 and 87 of film 80.

Additional layers 113 and 114 of film 110 (FIG. 4) are equivalent to additional layers 83 and 84 respectively of film 80 (FIG. 3).

The invention may be further understood by reference to the examples below. Immediately below is a table itemizing resins employed in actual structures produced in accordance with the invention.

EPE 8160 is a blend of 90% low density polyethylene (Dow PE 722) having a density of about 0.916 grams per cubic centimeter and a melt index of about 8 grams per ten minutes, and 10% of a collodal silica (Syloid 378) (W. R. Grace & Co.).

Table 2 lists six examples prepared from the resins itemized in Table 1. In each instance, the film component of the thermoformable sheet was coextruded by hot blowing the component resins from a coextrusion die.

TABLE 2

| EXAMPLE | CONSTRUCTION | COMMENTS |
|---|---|---|
| 1 | /90% $EVA_1$<br>POLYSTYRENE/+ 10% $ADDITIVE_1$/$EVA_7$/$LLDPE_1$/$EVA_4$/$S_1$/$EVA_4$/$EVA_3$ | The $LLDPE_1$ layer was extruded as two adjacent layers; 2 mil film was corona bonded to 37 mil foamed polystyrene sheet. |
| 2 | /90% $EVA_2$<br>POLYSTYRENE/+ 10% $ADDITIVE_1$/$EVA_7$/$LLDPE_1EVA_4$/$S_1$/$EVA_4$/$EVA_3$ | The $LLDPE_1$ was extruded as two adjacent layers; 2 mil film was corona bonded to 37 mil foamed polystyrene sheet. |
| 3 | POLYSTYRENE/$EVA_3$/$EVA_7$/$LLDPE_2$/$EVA_5$/$S_1$/$EVA_5$/$EVA_3$ | The LLDPE was extruded as two adjacent layers; 2 mil film was corona bonded to 37 mil foamed polystyrene sheet. |
| 4 | /79.5% $EVA_1$<br>POLYSTYRENE/+ 20.1% $ADDITIVE_1$/$EVA_6$/$S_2$/$EVA_6$/$EVA_7$/$EVA_6$/$EPC_1$ | The $EVA_7$ was extruded as two adjacent layers; 2 mil film was thermally bonded to 75 mil foamed polystyrene sheet at 202° F. |
| 5 | /90% $EVA_1$<br>POLYSTYRENE/+ 10% $ADDITIVE_1$/$EVA_7$/$LLDPE_1$/$EVA_6$/$S_1$/$EVA_6$/$EVA_3$ | The $LLDPE_1$ was extruded as two adjacent layers; 2 mil film was thermally bonded to 37 mil foamed polystyrene sheet at 165° F. |
| 6 | /90% $EVA_1$<br>POLYSTYRENE/+ 10% $ADDITIVE_1$/$EVA_7$/$LLDPE_1$/$EVA_6$/$S_1$/$EVA_6$/$EVA_3$ | The $LLDPE_1$ was extruded as two adjacent layers; 2 mil film was thermally bonded to 37 mil foamed polystyrene sheet at 202° F. |
| 7 | /90% $EVA_1$<br>POLYSTYRENE/+ 10% $ADDITIVE_1$/$EVA_7$/$LLDPE_1$/$EVA_6$/$S_1$/$EVA_6$/$EVA_3$ | The $LLDPE_1$ was extruded as two adjacent layers; 2 mil film was corona bonded to 37 mil foamed polystyrene sheet. |
| 8 | /80% $EVA_1$<br>POLYSTYRENE/+ 20% $ADDITIVE_1$/$EVA_6$/$EVA_6$/$EVA_6$/$EVA_6$/S/$EVA_6$/$LLDPE_3$ | |

TABLE 1

| | | |
|---|---|---|
| $EVA_1$ = | ELVAX 3180 | (DuPont) |
| $EVA_2$ = | PE 3432 | (DuPont) |
| $EVA_3$ = | XR 32.89 | (Exxon) |
| $EVA_4$ = | ELVAX 3165 | (DuPont) |
| $EVA_5$ = | ELVAX 3175 | (DuPont) |
| $EVA_6$ = | ELVAX 3508 | (DuPont) |
| $EVA_7$ = | ALATHON F3445 | (DuPont) |
| $LLDPE_1$ = | DOWLEX 2045.03 | (Dow) |
| $LLDPE_2$ = | ESCORENE LL 3001.63 | (Exxon) |
| $LLDPE_3$ = | DOWLEX 2035 | (Dow) |
| $S_1$ = | SARAN | (Dow) |
| $S_2$ = | PV864 | (Solvay) |
| $ADDITIVE_1$ = | EPE 8160 | (TEKNOR APEX) |
| $EPC_1$ = | FINA 8473 | (Fina) |
| POLYSTYRENE supplied by W. R. Grace & Co. | | |

ELVAX 3180 has a vinyl acetate content of 28% by weight, and a melt index of 25 grams per 10 minutes.

PE 3432 has a vinyl acetate content of 20% by weight, and a melt index of 3 grams per 10 minutes.

XR 32.89 has a vinyl acetate content of 4% by weight, and a melt index of 10 grams per 10 minutes.

DOWLEX 2045.03 has a density of about 0.921 grams per cubic centimeter.

PV 864 is an unplasticized saran of low viscosity.

Figure 5:
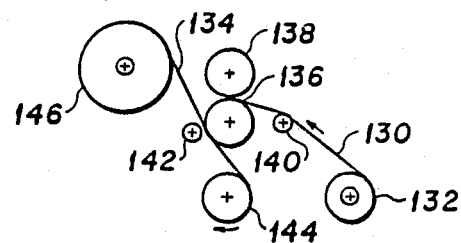
FIG. 5 is a schematic diagram of an apparatus for producing thermoformable sheet by means of heat and pressure.

Examples 4, 5, and 6 were laminated by using a modified 3 roll sheet stack equipment. A schematic illustration of a thermal bonding method is shown in FIG. 5. In this method the barrier film 130 was unwound passed a tension roll 140 onto a heated center roll 136 where it was preheated. In the case of Example 4, the film was preheated to 194° F. prior to being pressed to the foam sheet 134. The foam sheet and preheated film were joined together by passing between a rubber covered nip roll 142 and roll 136 and being pressed together. The sheet was passed to roll 144. The sheet of Example 4, comprising 75 mils polystyrene and 2 mils of the barrier film, was observed after thermal bonding to increase in gauge to 100 mils. The barrier film and foamed polystyrene has been pressed through steel rolls set at 202° F. with a 30 mil gap. Thus, the foamed polystyrene recovered its gauge and further expanded from the heat applied.

When heat and pressure are used to bond the film and sheet together, roll temperature may vary from about 150° F. to 250° F., more preferably from about 175° F. to 225° F., and most preferably from about 195° F. to 205° F.

The amount of pressure suitable for the practice of the invention is difficult to quantify because of the complex load paths associated with typical multiple-roll apparatus as described earlier. However, pressure should be as enough to create a bond between the film and sheet having a peel strength in the finished product (which may include a subsequent thermoforming step) of at least about 100 grams per linear inch. Put differently, pressure should be sufficient to result in an integral bond which will not readily fail either after bonding, or (if the thermoformable sheet is subsequently used in a thermoforming operation) after final processing into a finished, thermoformed package.

Figure 7:
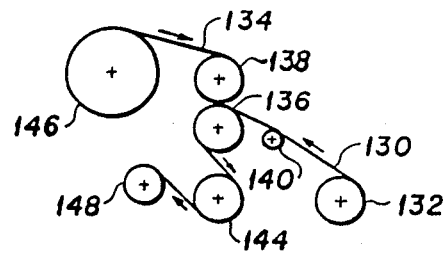
FIG. 7 is a schematic diagram of an alternate apparatus for producing thermoformable sheet by means of heat and pressure.

A more preferred thermal bonding method is illustrated schematically in FIG. 7. The barrier film 130 was unwound onto center roll 136 via tension roll 140. The film was preheated at center roll 136 which was kept at 205° F. At the same time, a foam polystyrene sheet 134 was fed from roll 146 to top roll 138 which was kept at 205° F. Foam sheet 134 and film 130 were joined together by passing between top roll 138 and center roll 136, and being pressed together. The gap between top and center rolls 138 and 136 was 30 mils. The resulting thermoformable sheet was passed around bottom roll 144 (kept at 73° F.) and taken up at take-up roll 148.

Figure 6:
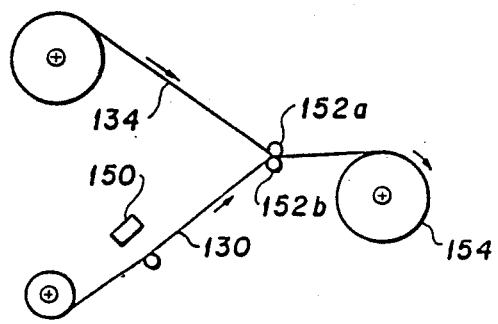
FIG. 6 is a schematic diagram of an apparatus for producing thermoformable sheet by means of corona bonding.

Referring to FIG. 6, for Examples 1, 2, 3, and 7, the coextruded films 130 were subjected to corona discharge treatment at a corona station 150 and then joined with the polystyrene sheet 134 and passed through a pair of nip rolls 152a and 152b, heated to 140° F. It was observed that the 2 mil corona treated films and the 37 mil corona treated polystyrene foam had a final thickness of 25 mils when both treated surfaces were pressed together. Thus, a thickness reduction in the overall laminates of about 14 mils, or about 36% was obtained.

Although the present invention has been described in connection with preferred embodiments, it is to be understood that modifications and variations may be utilized without departing from the principles and scope of the invention as those skilled in the art will readily understand. Accordingly such modifications and variations may be practiced within the scope of the following claims.

What is claimed is:

1. A method of making a thermoformable barrier sheet comprising:
    (a) providing a film comprising:
        (i) a surface layer comprising a polymeric material selected from the group consisting of polypropylene, polyethylene, and copolymers thereof;
        (ii) an internal layer comprising a polymer having low oxygen transmission selected from the group consisting of a copolymer of vinylidene chloride and ethylene vinyl alcohol copolymer; and
        (iii) a bonding layer comprising an ethylene unsaturated ester copolymer capable of adhesion to a thermoformable plastic when exposed to corona discharge;
    (b) providing a thermoformable polystyrene sheet;
    (c) exposing the bonding layer of the film to corona discharge; and
    (d) bonding the film and sheet together.

2. A method of making a thermoformable barrier sheet comprising:
    (a) providing a film comprising:
        (i) a surface layer comprising a polymeric material selected from the group consisting of polypropylene, polyethylene, and copolymers thereof;
        (ii) an internal layer comprising a polymer having low oxygen transmission selected from the group consisting of a copolymer of vinylidene chloride and ethylene vinyl alcohol copolymer; and
        (iii) a bonding layer comprising an ethylene unsaturated ester copolymer capable of adhesion to a thermoformable plastic when exposed to heat and pressure;
    (b) providing a thermoformable polystyrene sheet;
    (c) bringing the film and sheet together; and
    (d) exposing the film and sheet to heat and pressure.

3. The method according to claim 2, wherein the film and sheet are passed through rolls set at between about 150° F. and 250° F.

* * * * *